US012338983B2

(12) United States Patent
Prigozen

(10) Patent No.: US 12,338,983 B2
(45) Date of Patent: Jun. 24, 2025

(54) CONFIGURABLE ILLUMINATION DEVICE

(71) Applicant: Jason Michael Prigozen, Loudonville, OH (US)

(72) Inventor: Jason Michael Prigozen, Loudonville, OH (US)

( * ) Notice: Subject to any disclaimer, the term of this patent is extended or adjusted under 35 U.S.C. 154(b) by 0 days.

(21) Appl. No.: 18/393,177

(22) Filed: Dec. 21, 2023

(65) Prior Publication Data

US 2024/0219013 A1 Jul. 4, 2024

Related U.S. Application Data

(60) Provisional application No. 63/436,395, filed on Dec. 30, 2022.

(51) Int. Cl.

| | |
|---|---|
| ***F21V 23/04*** | (2006.01) |
| ***A47G 33/00*** | (2006.01) |
| ***F21S 10/04*** | (2006.01) |
| ***G04G 7/00*** | (2006.01) |
| ***G04G 11/00*** | (2006.01) |
| ***H05B 47/19*** | (2020.01) |
| *H05B 47/16* | (2020.01) |

(52) U.S. Cl.

CPC .......... *F21V 23/0435* (2013.01); *A47G 33/00* (2013.01); *F21S 10/04* (2013.01); *G04G 7/00* (2013.01); *G04G 11/00* (2013.01); *H05B 47/19* (2020.01); *H05B 47/16* (2020.01)

(58) Field of Classification Search

CPC ......... F21S 10/04; A47G 33/00; G04G 11/00; H05B 47/16; H05B 47/19

See application file for complete search history.

(56) References Cited

U.S. PATENT DOCUMENTS

| | | | | |
|---|---|---|---|---|
| 7,186,003 | B2 * | 3/2007 | Dowling ................ | H05B 45/00 362/253 |
| 9,801,248 | B2 | 10/2017 | Reed et al. | |
| 10,624,183 | B1 | 4/2020 | Recker et al. | |
| 10,952,307 | B1 | 3/2021 | Recker et al. | |

(Continued)

FOREIGN PATENT DOCUMENTS

| | | |
|---|---|---|
| CA | 2957199 | 1/2019 |
| JP | 6651103 B2 | 2/2020 |

OTHER PUBLICATIONS

Halperin, et al.: "Miracle Machine in the Making: Soulful Speculation with Kabbalah"; DIS '23, Jul. 10-14, 2023, Pittsburgh, PA, USA; pp. 1740-1756.

(Continued)

*Primary Examiner* — Zheng Song

(74) *Attorney, Agent, or Firm* — Tarolli, Sundheim, Covell & Tummino LLP

(57) ABSTRACT

One example includes an illumination device. The illumination device can include at least one electric light source and a transceiver configured to communicatively interface with a remote device. The illumination device can further include a processor configured to obtain a real-time clock and present calendar day reference from the remote device via the transceiver. The processor can further be configured to at least one of activate and deactivate the at least one electric light source at respective predefined times associated with at least one religious ceremony based on the real-time clock and the present calendar day reference.

20 Claims, 3 Drawing Sheets

(56) References Cited

U.S. PATENT DOCUMENTS

| | | | | |
|---|---|---|---|---|
| 2010/0068970 | A1* | 3/2010 | Fong | G04G 7/00<br>709/224 |
| 2010/0261124 | A1* | 10/2010 | Neumeier | F23D 3/16<br>431/126 |
| 2011/0121654 | A1* | 5/2011 | Recker | H05B 45/3725<br>307/64 |
| 2012/0223661 | A1* | 9/2012 | Bloch | H05B 47/16<br>315/360 |
| 2016/0215971 | A1* | 7/2016 | Silver | A47G 33/00 |
| 2017/0127501 | A1* | 5/2017 | Isaacs | H05B 47/196 |
| 2019/0274206 | A1* | 9/2019 | Altamura | F21V 23/003 |
| 2019/0350071 | A1* | 11/2019 | Haverlag | H05B 47/16 |

OTHER PUBLICATIONS

Ikeaormanasrgbledlightstrip: found on the internet on Dec. 4, 2024 at: https://www.theverge.com/2023/11/8/23952022/ikea-ormanas-rgb-led-light-strip-dirigera-homekit-compatible.

KOCHSmartMenorah: found on the internet on Dec. 4, 2024 at: https://appadvice.com/app/smart-menorah/1059890599.amp.

* cited by examiner

CONFIGURABLE ILLUMINATION DEVICE

RELATED APPLICATIONS

This application claims priority from U.S. Patent Application Ser. No. 63/436,395, filed 30 Dec. 2022, which is incorporated herein by reference in its entirety.

TECHNICAL FIELD

The present invention relates generally to illumination devices, and specifically to a configurable illumination device.

BACKGROUND

For millennia, candles have been used as illumination sources. Prior to electricity, candles were used as a primary source of illumination in darkness, but even after the invention of electric light, candles have continued to be used in spiritual and religious ceremonies. One such example is the menorah, which includes nine candles that are lit over the course of eight separate days during Hanukkah. While candles are still used in the modern day for many spiritual and religious ceremonies and holidays, some candles have been replaced by electric light for convenience and safety reasons. Many spiritual and religious ceremonies, however, dictate timing as to when the candles or electric lights are to be lit or illuminated, respectively, based on tradition and/or dogmatic teachings in religious texts and/or scripture.

SUMMARY

One example includes an illumination device. The illumination device can include at least one electric light source and a transceiver configured to communicatively interface with a remote device. The illumination device can further include a processor configured to obtain a real-time clock and present calendar day reference from the remote device via the transceiver. The processor can further be configured to at least one of activate and deactivate the at least one electric light source at respective predefined times associated with at least one religious ceremony based on the real-time clock and the present calendar day reference.

Another example includes a method for simulating lighting candles in a religious holiday ceremony. The method includes providing power to an illumination device associated with the religious holiday ceremony. The illumination device includes at least one electric light source, a transceiver, a processor; and a memory. The method also includes initiating communication between the illumination device and a remote device via the transceiver and accessing at least one specific calendar day and at least one specific time of day associated with the religious holiday from a network via the remote device. The method also includes transmitting the at least one specific calendar day and the at least one specific time of day to the illumination device and storing the at least one specific calendar day and the at least one specific time of day in the memory of the illumination device. The method further includes synchronizing a local clock associated with the illumination device with a real-time clock and present calendar day reference associated with the remote device and activating the at least one electric light source on the at least one specific calendar day at the at least one specific time of day via the processor.

Another example includes electronic Hanukkah menorah. The electronic Hanukkah menorah includes a plurality of electric light sources and a transceiver. The transceiver is configured to communicatively interface with a remote device to obtain specific calendar dates and specific times associated with Hanukkah, and to obtain a real-time clock and present calendar day reference from the remote device. The electronic Hanukkah menorah also includes a memory configured to store the specific calendar dates and the specific times associated with Hanukkah. The electronic Hanukkah menorah further includes a processor configured to activate and deactivate the electric light sources on each of the specific days at each of the specific times associated with Hanukkah based on the real-time clock and the present calendar day reference.

DETAILED DESCRIPTION

The present invention relates generally to illumination devices, and specifically to a configurable illumination device. The configurable illumination device (hereinafter, "illumination device") can be associated with one or more religious ceremonies. As described herein, the term "religious ceremony" describes any of a variety of religious, spiritual, and/or faith-based ceremonial activities or holidays which includes illumination, such as to simulate the lighting or extinguishing of candles, at one or more specific calendar days and/or times of day that are dictated by the traditions and/or tenets of the religion or faith. The illumination device can be configured to interface (e.g., wirelessly) with a remote device to obtain a real-time and calendar day reference, such that the illumination device can activate and deactivate at least one electric light source at the specific days and/or times dictated by the traditions and/or tenets of the religion or faith.

Figure 1:
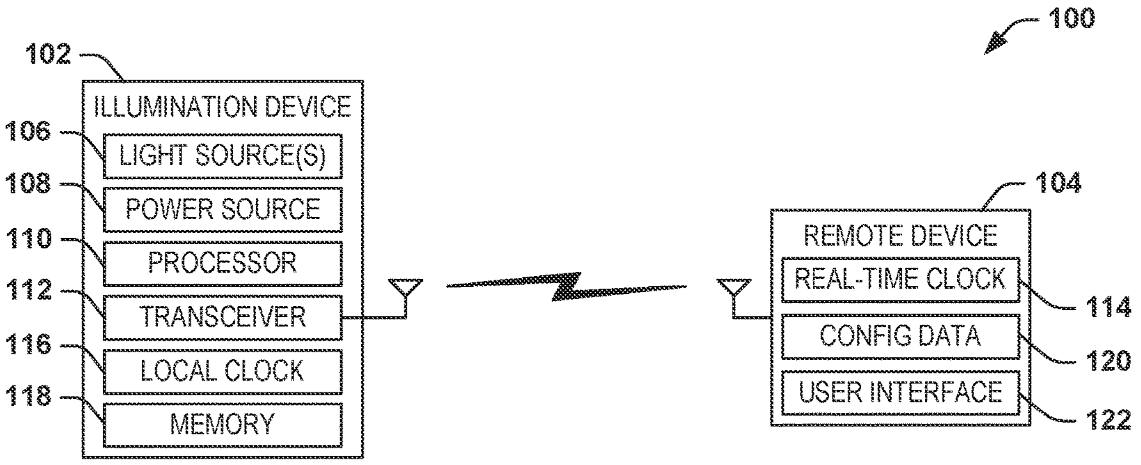
FIG. 1 illustrates an example block diagram of an illumination device system.

FIG. 1 illustrates an example block diagram of an illumination device system 100. The illumination device system 100 includes an illumination device 102 and a remote device 104. In the example of FIG. 1, the illumination device 102 includes at least one electric light source 106 and a power source 108. The power source 108 can be one or more batteries, or can be a plug to access external power (e.g., 120 VAC from a wall outlet), such as to provide direct current (DC) power to the illumination device 102 via a power converter. The electric light source(s) 106 can correspond to any of a variety of electric light sources, such as light-emitting diodes (LEDs), incandescent bulbs, or a variety of other light sources.

The illumination device 102 also includes a processor 110 and a transceiver 112. The transceiver 112 is configured to interface with the remote device 104 to allow the processor 110 to access a real-time clock 114 and/or data that is stored on or accessed by the remote device 104. For example, the remote device 104 can be configured to run a dedicated program (e.g., application or "app") or access a dedicated website associated with configuration and/or operation of the illumination device 102. Therefore, the transceiver 112 can access the program or website to obtain configuration information that can include the real-time clock 114, geographic location data, calendar data, and/or operational data associated with a holiday event, as described in greater detail herein.

As described herein, the real-time clock 114 can include real-time clock and present calendar day reference data, such as provided from a typical Internet connection and/or from cellular base-stations. Therefore, the real-time clock 114 is provided as a reference on the remote device 104. In the example of FIG. 1, the illumination device 102 also includes a local clock 116. As an example, in response to accessing the real-time clock 114, the processor 110 can be configured to synchronize the local clock 116 to the real-time clock 114, such that the local clock 116 operates at the present time and day based on the real-time clock 114.

As an example, the remote device 104 can be a portable electronic device, such as a smart-phone, a tablet computer, or a laptop computer. While the remote device 104 is demonstrated as a single device, multiple remote devices can be concurrently or sequentially accessed by the transceiver 112 for configuration and/or operation of the illumination device 102. For example, the transceiver 112 can be configured to wirelessly communicate with the remote device 104, such as via Wi-Fi, Bluetooth, or a variety of other communications media. Alternatively, while the example of FIG. 1 demonstrates wireless communication between the illumination device 102 and the remote device 104, the transceiver 112 can use a wired communications cable or plug-in interface (e.g., a thumb-drive or a Universal Serial Bus (USB) Bluetooth or WiFi interface) to access the real-time clock 114 and/or other data from the remote device 104.

For example, the transceiver 112 can be configured, such as upon power-up of the illumination device 102, to wirelessly access a website or program that is hosted on the remote device 104 to obtain the real-time clock 114 and/or other data associated with operation of the illumination device 102. As an example, the transceiver 112 can attempt to obtain a wireless connection with the remote device 104 automatically (e.g., without user prompt) in response to power-up via the power source 108, such that the remote device 104 can detect a wireless signature of the transceiver 112 (e.g., Bluetooth signal connection) and can be authorized to wirelessly connect to the transceiver 112 in response to a user input. As an example, the remote device 104 can be configured to operate a program that is dedicated to configuration and/or operation of the illumination device 102. As another example, the remote device 104 can be or can include a local base station, such that the transceiver 112 can communicate with the local base station (e.g., via Short Messaging Service (SMS)) to obtain the real-time clock 114. In the example of the remote device 104 being or including a local base station, the transceiver 112 can be configured to periodically ping the local base station to request access to the real-time clock 114 and/or geographic location data. Therefore, the illumination device 102 can be configured to communicate with the remote device 104 in any of a variety of ways. In any example, the transceiver 112 can periodically access the real-time clock 114, such as to update the local clock 116 to account for potential clock drift errors and/or time adjustments (e.g., daylight saving time).

The illumination device 102 can, for example, be associated with one or more religious ceremonies. Therefore, the illumination device 102 can provide time-based activation and/or deactivation of the electric light source(s) 106 in accordance with the tenets of the religious ceremony or ceremonies with which it is associated, as described in greater detail herein. For example, because many religious ceremonies involve lighting candles at specific times on specific days, the illumination device 102 can simulate the lighting and/or extinguishing of candles at the specific days and times in accordance with the tenets of the religious ceremony or ceremonies with which it is associated. Therefore, as described herein, the illumination device 102 can be configured to automatically activate and deactivate the electric light source(s) 106 at the appropriate days and times of the religious ceremony based on the real-time clock and present calendar day reference, as provided by the real-time clock 114 from the remote device 104.

In the example of FIG. 1, the illumination device 102 further includes a memory 118 (e.g., a non-transitory storage device). As an example, the processor 110 can be configured to store the times of activation and/or deactivation of the electric light source(s) 106 in the memory 118, such as dictated by the tenets of the religious ceremony and/or holiday. Therefore, in response to the local clock 116 achieving a specific time of activation or deactivation of one or more of the electric light source(s) 106, as saved in the memory 118, the processor 110 can appropriately activate or deactivate the corresponding electric light source(s) 106.

As another example, in addition to accessing the real-time clock 114 from the remote device 104, the processor 110 can also be configured to access a configuration data set ("CONFIG DATA") 120 from the remote device 104 via the transceiver 112. As an example, the configuration data set 120 can be configured as an executable file or extension, set of data instructions, or any of a variety of data types that can be received by the transceiver 112 and interpreted and/or executed by the processor 110. In the example of FIG. 1, the remote device 104 can include a user interface 122 with which a user can generate the configuration data set 120 for operation of the illumination device 102 in the religious ceremony/holiday. The configuration data set 120 can thus be provided to the illumination device 102 via the transceiver 112, such that the configuration data set 120 can be saved in the memory 118 to be accessible by the processor 110 to activate and deactivate the electric light source(s) 106 at the appropriate times based on the configuration data set 120.

As an example, the user interface 122 can include or can correspond to a dedicated program (e.g., app) for configuration and/or operation of the illumination device 102. For example, the user can implement the user interface 122 to set the parameters for use of the illumination device 102 according to the tenets of the religious ceremony or holiday, such as dictating the activation and deactivation times of the electric light source(s) 106, such as using a mobile app or other software program. As another example, the user interface 122 can allow the user and/or the transceiver 112 to access data associated with the appropriate times of lighting candles for the religious ceremony or ceremonies for a given calendar year. Therefore, the user interface 122 can automatically generate the configuration data set 120 with the appropriate times of lighting the candles for the religious ceremony or ceremonies for the given calendar year and/or for the subsequent years indefinitely. The user interface 122 can further allow modification of the times of activation and/or deactivation (e.g., duration of illumination) of the electric light source(s) 106, which can thus be defined in the configuration data set 120. Thus, the user interface 122 can allow for local and/or familial modifications to the tenets of the religious ceremony or holiday with respect to the activation and/or deactivation of the electric light source(s) 106.

While the example of FIG. 1 demonstrates that the user interface 122 is located on the remote device 104, the user interface 122 could instead or additionally be located on the illumination device 102 as a local user interface. The user interface 122 provided as a local user interface can be implemented to configure activation and deactivation times of the electric light source(s) 106 based on the real-time clock 114 accessed from the remote device 104, or from a clock that can be set at the local user interface.

As a further example, some religious ceremonies are not consistent with specific days of the year and/or times of day. For example, some religious ceremonies dictate that candles are to be lit at sunset, which can change from day to day in a given year, as well as from location to location. Therefore, for a given holiday or ceremony, the specific day of the year and time of day may change. As a result, while the configuration data set 120 may include the specific days and times of illumination for the specific holiday or ceremony, such information may differ for different locations. Therefore, the processor 110 can be further configured to access the local meteorological data for a given location. As an example, the illumination device 102 can include a global satellite navigation system (GSNS) transponder, such as a global positioning satellite (GPS) transponder, to provide the processor 110 with a specific location of the illumination device 102. Therefore, the processor 110 can access the local meteorological data via the transceiver 112, such as with the data from the real-time clock 114.

As another example, the local meteorological data can be accounted for in the configuration data set 120, such as based on the user interface 122 accessing location services associated with the remote device 104. For example, the user interface 122 can be configured to access the dates of the religious holiday from a network (e.g., the Internet) and the geographic location of the illumination device 102 (e.g., from the location services of the proximal remote device 104). Therefore, the user interface 122 can save the activation and/or deactivation times of the electric light source(s) 106 based on the expected sunrise and/or sunset times in the configuration data set 120 for the geographic location of the illumination device 102 on the specific dates of the religious holiday. Thus, in response to the configuration data set 120 being saved in the memory 118 via access by the transceiver 112, the processor 110 can activate and/or deactivate the electric light source(s) 106 at the appropriate times saved in the configuration data set 120 that correspond to sunrise and/or sunset times at the location of the illumination device 102. Accordingly, the processor 110 can provide activation and/or deactivation of the electric light source(s) 106 based on local conditions, such as sunrise, sunset, or a variety of other non-specific times associated with a given religious ceremony.

Figure 2:
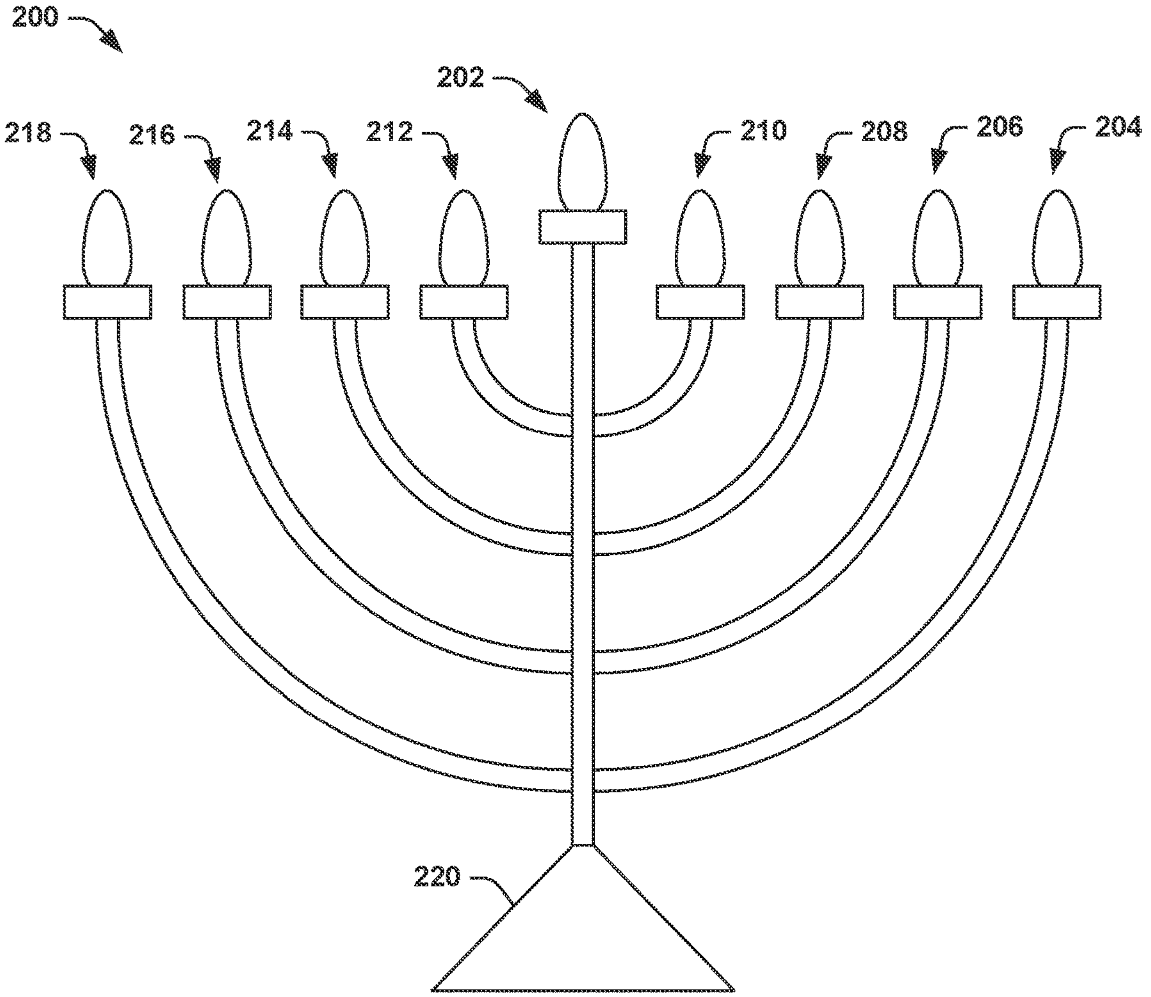
FIG. 2 illustrates an example of an illumination device.

FIG. 2 illustrates an example of an illumination device 200. The illumination device 200 can correspond to the illumination device 102 in the example of FIG. 1. Therefore, reference is to be made to the example of FIG. 1 in the following description of the example of FIG. 2. In the example of FIG. 2, the illumination device 200 is demonstrated as an electronic Hanukkah menorah (e.g., a Hanukkiah). However, the illumination device 102 described in the example of FIG. 1 is not limited to a Hanukkah menorah or even the Jewish faith, but can be implemented for any of a variety of faiths, religions, or spiritual traditions and/or customs that involve providing illumination at specific times (e.g., Shabbat, Diwali, Mass, etc.).

The illumination device 200 includes a set of electric lights that simulate candles, and are thus referred to hereinafter as candles. The illumination device 200 includes a first candle 202, a second candle 204, a third candle 206, a fourth candle 208, a fifth candle 210, a sixth candle 212, a seventh candle 214, an eighth candle 216, and a ninth candle 218. The candles 202 through 218 are arranged as supported by a base 220 that can be configured to house the electronic components of the illumination device 200. For example, the base 220 can house the power source 108 (e.g., batteries and/or a plug-in adapter), the processor 110, the transceiver 112 (e.g., and an associated antenna), the local clock 116, and the memory 118.

Figure 3:
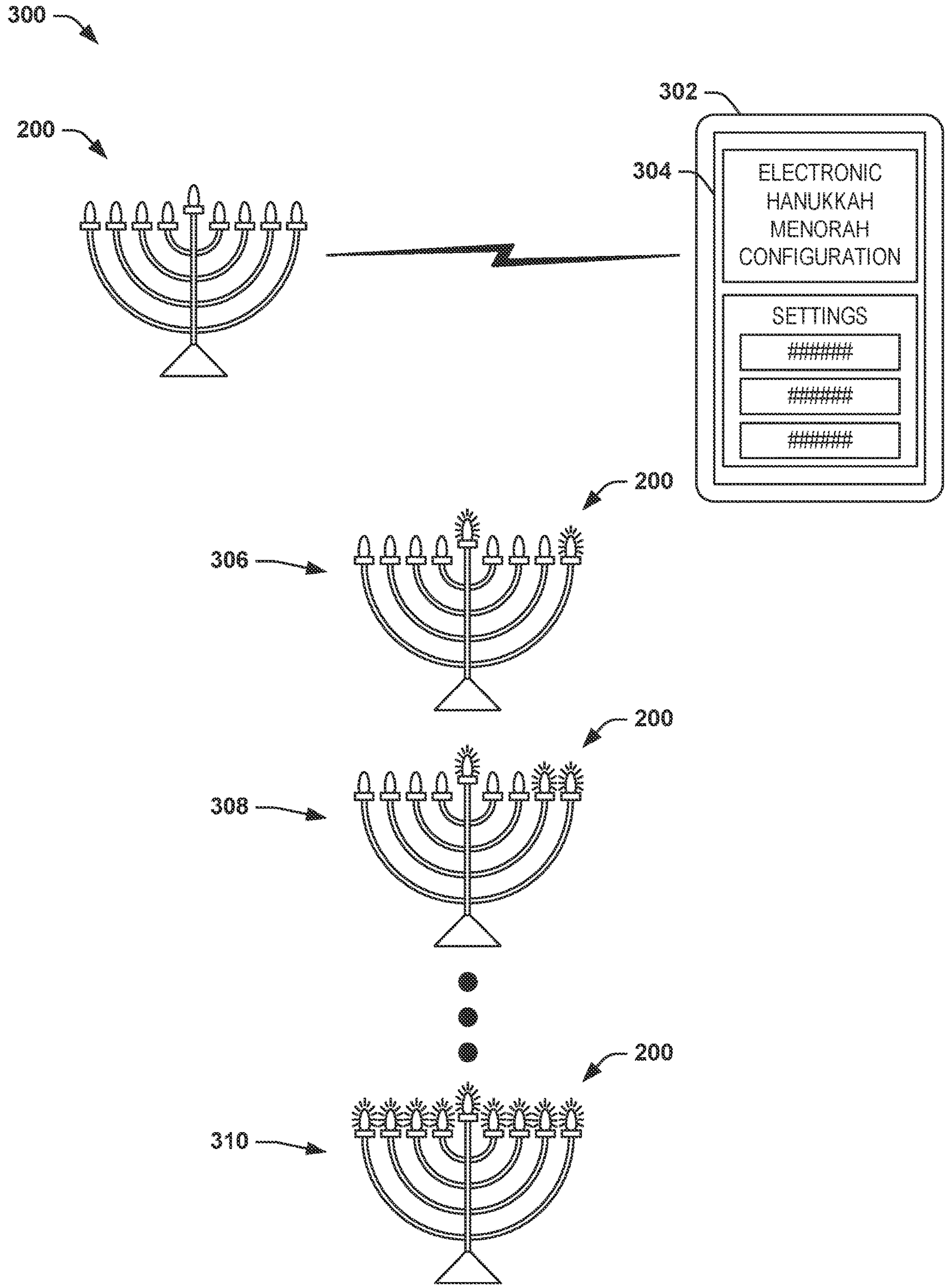
FIG. 3 illustrates an example diagram of configuration and operation of an illumination device.

FIG. 3 illustrates an example diagram 300 of configuration and operation of an illumination device. The illumination device described in the example of FIG. 3 can correspond to the illumination device 200 in the example of FIG. 2. Therefore, reference is to be made to the example of FIGS. 1 and 2 in the following example of FIG. 3, and like reference numbers are used in the example of FIG. 3 as are provided in the example of FIG. 2.

As an example, upon initial power-up, the illumination device 200 can be configured for operation. For example, the illumination device 200 can be paired (e.g., communicatively coupled via the transceiver 112 operating with Bluetooth or WiFi) with a mobile app on a computer device 302, demonstrated in the example of FIG. 3 as a smartphone and corresponding to the remote device 104. In the example of FIG. 3, the computer device 302 is demonstrated as operating a mobile app 304 that is dedicated to the setup and configuration of the illumination device 200, and can thus correspond to the user interface 122. The mobile app 304 on the computer device 302 can be configured to facilitate creation of the configuration data set 120 and access to other resources on the computer device, such as the real-time clock 114 and the location services corresponding to the geographic location of the computer device 302.

Therefore, the processor 110 can access the real-time clock 114 and the configuration data set 120 from the computer device 302. As an example, the configuration data set 120 can include all of the calendar days and times of activation and deactivation (e.g., activation duration) of the candles 202 through 218. For example, the mobile app 304 of the computer device 302 can facilitate access of the calendar days of Hanukkah for each given year, such as through user input or through accessing a dedicated network location (e.g., Internet website) that can track the calendar days of Hanukkah at any given year. The mobile app 304 can also access the location services of the computer device 302, such that the mobile app 304 can generate the configuration data set 120 with the appropriate times to light the candles (e.g., activate the candles 202 through 218) at sunset of each day of Hanukkah based on local meteorological data. Therefore, the transceiver 112 can access the configuration data set 120 from the computer device 302. The processor 110 can then store the configuration data set 120 in the memory 118 and can synchronize the local clock 116 to the real-time clock 114 accessed from the computer device 302.

As an example, on the first night of Hanukkah, as demonstrated in the example of FIG. 3 at 306, the processor 110 can access the configuration data set 120 from the memory 118 to activate the first candle 202 (e.g., the Shamash) first, and can activate the second candle 204 after a predefined duration of time (e.g., thirty seconds), such as configurable via the mobile app 304. The lighting of the first and second candles 202 and 204 can occur after sunset of the specific calendar day before the first day of Hanukkah, as defined in the configuration data set 120. The first and second candles 202 and 204 can thus remain illuminated for a predefined duration of time, or can be deactivated at a predefined time, such as based on the configuration data set 120.

On the second night of Hanukkah, as demonstrated in the example of FIG. 3 at 308, the processor 110 can access the configuration data set 120 from the memory 118 to activate the first candle 202 (e.g., the Shamash) first, and can activate the third candle 206 then the second candle 204 in a sequence after a predefined duration of time (e.g., thirty seconds), such as configurable via the mobile app 304. As an example, the third and second candles 206 and 204 can be lit in a timed sequence that can simulate the amount of time it takes to light actual candles in a sequence (e.g., one or two seconds), which can be configurable in the configuration data set 120 by the mobile app 304. The sequential lighting of the first, third, and second candles 202, 206, and 204 can occur after sunset of the specific calendar day before the second day of Hanukkah, as defined in the configuration data set 120. The first, third, and second candles 202, 206, and 204 can thus remain illuminated for a predefined duration of time, or can be deactivated at a predefined time, such as based on the configuration data set 120.

The candles can thus be lit in the appropriate sequence for Hanukkah for the remaining six days of Hanukkah until the last night of Hanukkah, as demonstrated in the example of FIG. 3 at 310, similar to as described above, based on the predefined activation and deactivation times provided in the configuration data set 120. Accordingly, the illumination device 200 can simulate the lighting of actual candles of a Hanukkah menorah during a Hanukkah celebration, without any involvement of a user, after initial setup. As a result, the illumination device 200 can provide for holiday, religious, or cultural celebrations in an easier and safer manner than using real candles.

Figure 4:
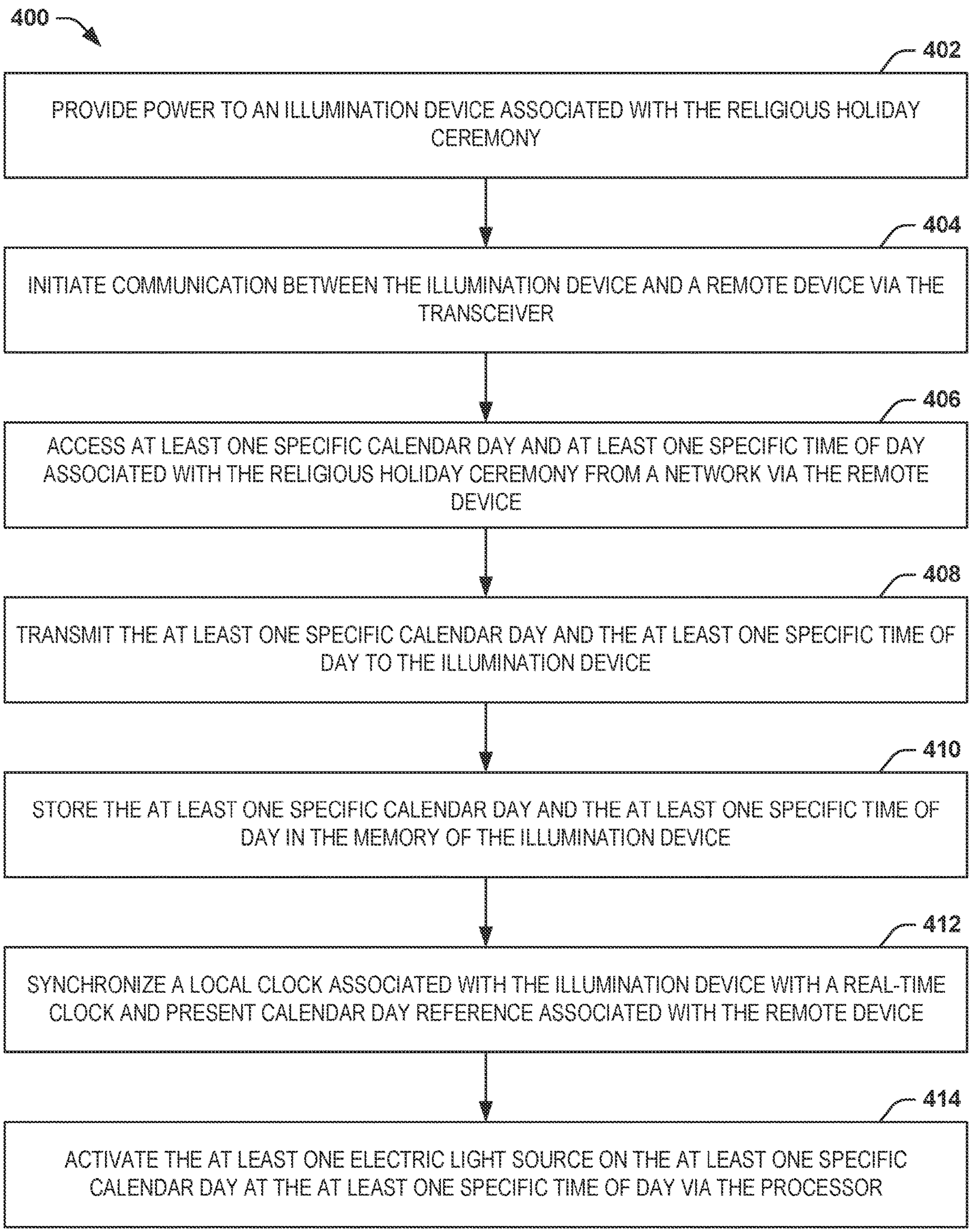
FIG. 4 illustrates an example of a method for simulating lighting candles in a religious holiday ceremony.

In view of the foregoing structural and functional features described above, a methodology in accordance with various aspects of the disclosure will be better appreciated with reference to FIG. 4. It is to be understood and appreciated that the method of FIG. 4 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 4 illustrates an example of a method 400 for simulating lighting candles in a religious holiday ceremony (e.g., Hanukkah). At 402, power is provided to an illumination device (e.g., the illumination device 100) associated with the religious holiday ceremony. The illumination device can include at least one electric light source (e.g., electric light source(s) 106), a transceiver (e.g., the transceiver 112), a processor (e.g., the processor 110), and a memory (e.g., the memory 118). At 404, communication is initiated between the illumination device and a remote device (e.g., the remote device 104) via the transceiver.

At 406, at least one specific calendar day and at least one specific time of day associated with the religious holiday is accessed from a network via the remote device. At 408, the at least one specific calendar day and the at least one specific time of day are transmitted to the illumination device. At 410, the at least one specific calendar day and the at least one specific time of day are stored in the memory of the illumination device. At 412, a local clock (e.g., the local clock 116) associated with the illumination device is synchronized with a real-time clock and present calendar day reference associated with the remote device. At 414, the at least one electric light source is activated on the at least one specific calendar day at the at least one specific time of day via the processor.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An illumination device comprising:

at least one electric light source;

a transceiver configured to communicatively interface with a remote device;

a local clock configured to maintain a real-time clock and present calendar day reference;

a memory configured to store predefined times associated with at least one religious ceremony; and a processor configured to obtain at least one of the real-time clock and present calendar day reference and the predefined times associated with at least one religious ceremony from the remote device via the transceiver, to access the predefined times associated with the at least one religious ceremony from the memory, and further configured to at least one of automatically activate and automatically deactivate the at least one electric light source at the respective predefined times associated with at least one religious ceremony based on the real-time clock and the present calendar day reference.

2. The illumination device of claim 1, wherein the predefined times correspond to at least one specific time of day on at least one specific calendar day dictated by the at least one religious ceremony.

3. The illumination device of claim 2, wherein the transceiver is configured to access location-based meteorological data to obtain the at least one specific time of day on the at least one specific calendar day corresponding to the predefined times associated with at least one religious ceremony.

4. The illumination device of claim 2, wherein the transceiver is configured to access data associated with the at least one specific time of day on the at least one specific calendar day associated with the at least one religious ceremony from the remote device.

5. The illumination device of claim 2, wherein the processor is configured to access a configuration data set from the remote device, wherein the configuration data set comprises data corresponding to the at least one religious ceremony with respect to the at least one of automatic activation and automatic deactivation of the at least one electric light source at the at least one specific time of day on the at least one specific calendar day.

6. The illumination device of claim 2, wherein the illumination device is a Hanukkah menorah, wherein the at least one electric light source comprises a plurality of electric light sources, wherein the at least one specific time of day and the at least one specific calendar day of activation of the electric light sources comprises sunset before each day of Hanukkah.

7. The illumination device of claim 1, wherein the processor is configured to synchronize the local clock to the real-time clock and the present calendar day reference accessed from the remote device.

8. The illumination device of claim 7, wherein the processor is configured to save the predefined times associated with at least one religious ceremony in the memory, such that the processor is configured to activate and deactivate the at least one electric light source at each of the predefined times on specific calendar days associated with at least one religious ceremony based on the local clock.

9. The illumination device of claim 1, wherein the transceiver is configured to wirelessly interface with the remote device configured as a portable electronic device, wherein the portable electronic device is configured to provide the real-time clock and the present calendar day reference to the processor via the transceiver.

10. The illumination device of claim 1, wherein the transceiver is configured to wirelessly interface with a mobile application on the remote device upon power-up of the illumination device to access and obtain the at least one of the real-time clock and present calendar day reference and the predefined times associated with at least one religious ceremony.

11. A method for simulating lighting candles in a religious holiday ceremony, the method comprising:

providing power to an illumination device associated with the religious holiday ceremony, the illumination device comprising at least one electric light source, a transceiver, a processor, and a memory;

initiating communication between the illumination device and a remote device via the transceiver;

accessing at least one specific calendar day and at least one specific time of day associated with the religious holiday ceremony from a network via the remote device;

transmitting the at least one specific calendar day and the at least one specific time of day to the illumination device;

storing the at least one specific calendar day and the at least one specific time of day in the memory of the illumination device;

synchronizing a local clock associated with the illumination device with a real-time clock and present calendar day reference associated with the remote device; and activating the at least one electric light source on the at least one specific calendar day at the at least one specific time of day via the processor.

12. The method of claim 11, wherein accessing the at least one specific calendar day and the at least one specific time of day comprises accessing location-based meteorological data to obtain the at least one specific time of day on the at least one specific calendar day.

13. The method of claim 12, wherein accessing the location-based meteorological data comprises:

accessing location services of the remote device to determine a geographic location of the remote device; and accessing the location-based meteorological data associated with the geographic location of the remote device to determine at least one of a sunrise and a sunset associated with the at least specific calendar day to determine the at least one specific time of day.

14. The method of claim 13, further comprising adjusting at least one of the at least one specific calendar day and the at least one specific time of day via a user interface associated with the remote device.

15. The method of claim 11, further comprising storing the at least one specific calendar day and the at least one specific time of day associated with the religious holiday ceremony in a configuration data set at the remote device, wherein transmitting the at least one specific calendar day and the at least one specific time of day comprises transmitting the configuration data set to the illumination device, wherein storing the at least one specific calendar day and the at least one specific time of day comprises storing the configuration data set in the memory of the illumination device.

16. The method of claim 11, wherein the illumination device is a Hanukkah menorah, wherein the at least one electric light source comprises a plurality of electric light sources, wherein the at least one specific time of day and the at least one specific calendar day of activation of the electric light sources correspond to sunset before each day of Hanukkah.

17. An electronic Hanukkah menorah comprising:

a plurality of electric light sources;

a local clock configured to maintain a real-time clock and present calendar day reference;

a transceiver configured to communicatively interface with a remote device to obtain at least one of specific calendar dates and specific times associated with Hanukkah and the real-time clock and present calendar day reference from the remote device;

a memory configured to store the specific calendar dates and the specific times associated with Hanukkah; and a processor configured to automatically activate and automatically deactivate the electric light sources on each of the specific calendar dates at each of the specific times associated with Hanukkah based on the real-time clock and the present calendar day reference.

18. The electronic Hanukkah menorah of claim 17, wherein the transceiver is configured to access location-based meteorological data to obtain times of sunset at a geographic location of the remote device on the specific calendar dates of Hanukkah, the times of sunset corresponding to one of the specific times.

19. The electronic Hanukkah menorah of claim 17, further comprising an electric power source, wherein the transceiver is configured to wirelessly interface with the remote device to obtain the specific calendar dates and the specific times associated with Hanukkah in response to power-up of the Hanukkah menorah via the electric power source.

20. The electronic Hanukkah menorah of claim 19, wherein the processor is configured to synchronize the local clock to the real-time clock and the present calendar day reference accessed from the remote device in response to power-up of the Hanukkah menorah via the electric power source.

* * * * *